United States Patent [19]
Patel et al.

[11] Patent Number: 5,844,980
[45] Date of Patent: *Dec. 1, 1998

[54] QUEUE MANAGING SYSTEM AND METHOD

[75] Inventors: Bipin Patel, San Jose; Chris Yuan, Fremont; Mark E. Kaminsky; Roberto Perelman, both of Sunnyvale; Jeanne Ichnowski, Palo Alto, all of Calif.

[73] Assignee: Siemens Business Communication Systems, Inc., Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 25,538

[22] Filed: Mar. 3, 1993

[51] Int. Cl.$^6$ .................................................. H04M 3/00
[52] U.S. Cl. ...................................... 379/266; 340/286.06
[58] Field of Search ................................... 395/250, 725, 395/732, 731, 292, 293, 294, 295, 296, 297, 298; 379/94, 244, 266; 370/412; 340/286.06

[56] References Cited

U.S. PATENT DOCUMENTS

| | | | |
|---|---|---|---|
| 4,398,257 | 8/1983 | Paganini et al. | 364/550 |
| 4,700,295 | 10/1987 | Katsof et al. | 364/401 |
| 4,757,529 | 7/1988 | Giapa et al. | 379/244 |
| 4,855,904 | 8/1989 | Daberkow et al. | 395/375 |
| 5,006,983 | 4/1991 | Wayne et al. | 364/401 |
| 5,193,110 | 3/1993 | Jones et al. | 379/94 |

FOREIGN PATENT DOCUMENTS 0236013  9/1987  WIPO .

OTHER PUBLICATIONS

Proceedings of the 6th Southern African Computer Symposium Jul. 2, 1991, Caledon, South Africa, pp. 69–82, A. E. Krzesinski et al., 'Product Form Solutions For Multiserver Centres With Hierarchical Concurrency Constraints'.
Proceedings of the 10th International Conference on Pattern Recognition, Jun. 16, 1990, Atlantic City, N.J., USA, pp. 648–653, C. H. Chien et al., 'PARADIGM: An Architecture for Distributed Vision Processing'.

*Primary Examiner*—Richard L. Ellis

[57] ABSTRACT

In a queue management system for servicing of a number of clients representing different client types, a controlling queue queues clients in a predetermined order. A queue manager allocates and reallocates a number of processing queues, less than the number of client types, to match different ones of said client types. The queue manager then places successive ones of the clients in the controlling queue into a processing queue matching the client type if there is a matching processing queue and allocates or reallocates an empty or emptied processing queue to the client type if there is no matching processing queue but there is an empty processing queue. A server empties the processing queues in batches. In the environment of a telephone system the clients are messages and the client types are codings in the messages for various destinations. The queue manager dedicates each of a number of processing queues to one of the destinations in the controlling queue, accesses the top message in the controlling queue, places the messages in a processing queue matching the destination code of the message if there is a match, and dedicates an empty processing queue to the target destination if there is no matching processing queue but there is an empty processing queue.

30 Claims, 11 Drawing Sheets

QUEUE MANAGING SYSTEM AND METHOD

BACKGROUND OF THE INVENTION

This invention relates to methods and means for assigning a queue of clients requiring different types of services to servers offering the needed services. In one aspect, the invention relates more particularly to methods and means for managing queues of recorded telephone messages to permit transmission of batches of messages to intended destinations.

Such queue managing systems assign services to clients that have varying processing requirements depending on their types. For each type of client, such as A, B, C, etc., they provide a class of server, such as A, B, C, etc., that can service the client. They may instead furnish universal servers that can transform themselves to different classes of servers, e.g. A, B, C, etc. as the client needs.

Most queue managing systems service clients in a predetermined order, for example on a first-in first-out (FIFO) basis. They effect service by using one of two queuing schemes, namely using a single queue strategy or a multiple queue strategy.

In the single queue strategy, all clients wait in the same queue in the order that they arrive and then undergo servicing one at a time. If the top client in the queue is of the same type as the one currently being serviced, for example type A, then the server which is processing the type A client can process the next type A client immediately. Otherwise the system must change to a class of server appropriate to the next client, for example type B, or search the queue for the next client of the first type, type A.

In the environment of an existing telephone voice mail system, where clients take the form of recorded messages coded for various destinations, the single queue strategy works as follows. All messages wait in the same queue in the order of their arrival and a server then services and transmits each message one at a time. If messages targeted for the same destination follow each other, then the system can transmit them as a batch. Otherwise, the system changes the destination to that of the next message, or searches the queue for a message intended for the same destination as the first message and extracts several messages to the same destination together for transmission as a batch.

Such single queue systems are clearly inefficient. They cannot easily accommodate concurrent servicing of different clients or messages.

The multiple queue strategy utilizes multiple queues and associates each queue with a client type and a corresponding server type. Clients of the same type wait in the same queue in the order that they arrive. With a multiple queue scheme in the environment of a telephone voice mail system, the clients are recorded messages coded for various destinations. Each of the multiple queues contains messages for a specific destination. The messages for the same destination wait in the same queue in the order that they arrive. Such multiple queue arrangements require a number of queues equal to the maximum number of destinations which may be very large or unknown. Each message has to pass to the particular queue of the destination.

An object of this invention is to improve queue management systems, particularly for telephone systems using voice mail.

Another object of the invention is to overcome the aforementioned disadvantages.

SUMMARY OF THE INVENTION

The invention involves assembling all the clients of varying types in a predetermined order in a controlling queue, periodically emptying each of a number of processing queues less than the number of client types, and transferring each successive client of a client type from the controlling queue only into a processing queue free of other client types. This allocates each processing queue to one client type until the processing queue is emptied and reallocates each emptied processing queue to the client type of the next client being transferred thereto.

Because the queue manager always appends, to each processing queue, the same type of client that processing queue already contains, the queue manager inherently allocates each processing queue to the type of client that the queue manger first places into that processing queue. This allocation continues until the server empties the processing queue. If the queue manager now places a new type of client in the empty processing queue the queue manager is deallocating the processing queue from the former type of client and reallocating it to the more recent type. This deallocation and reallocation allows a limited number of processing queues, such as fifty, to handle any number of client types, such as a thousand or more.

According to a specific aspect of the invention, namely one in a telephone environment, the clients are recorded voice mail messages coded for transmission to a number of destinations. All messages for all destinations appear in the controlling queue in a predetermined order, such as on a first-in first-out basis. The queue manager distributes the messages in the controlling queue, one by one, among a number of processing queues less than the number of destinations by placing each successive first message in the controlling queue onto a processing queue whose destination matches the destination of the first message. If there is no matching processing queue, the queue manager places the first message into an empty processing queue if there is an empty processing queue. If there is no empty processing queue, the queue manager holds the message in the controlling queue until a transmission of messages from the processing queues empties a processing queue. The queue manager then reallocates that processing queue for transmission only to the new destination and places the next message into the empty processing queue.

The invention uses a limited number of queues to allow concurrent servicing of a large number of client types or destinations. There is virtually no limitation on the different client types or destinations. Clients of the same type or messages for the same destination wait in the same processing queue. The clients or messages wait in the same queue, normally in chronological order although different orderings are possible. Concurrent processing of different client types or message destinations is easily available. The system dynamically allocates queues to each client type or destination and deallocates them as they become empty and new client types or messages for new destinations arrive. The invention associates common attributes relevant to the processing of a given client type or destination with the corresponding queue for ease of processing.

Processing of multiple client types or messages for multiple destinations becomes more efficient than for a single queue scheme as well as for previous multiple queue systems. The invention allows for great flexibility in processing.

These and other features of the invention are pointed out in the claims forming a part of this specification. Other

DETAILED DESCRIPTION OF PREFERRED EMBODIMENTS

Figure 1:
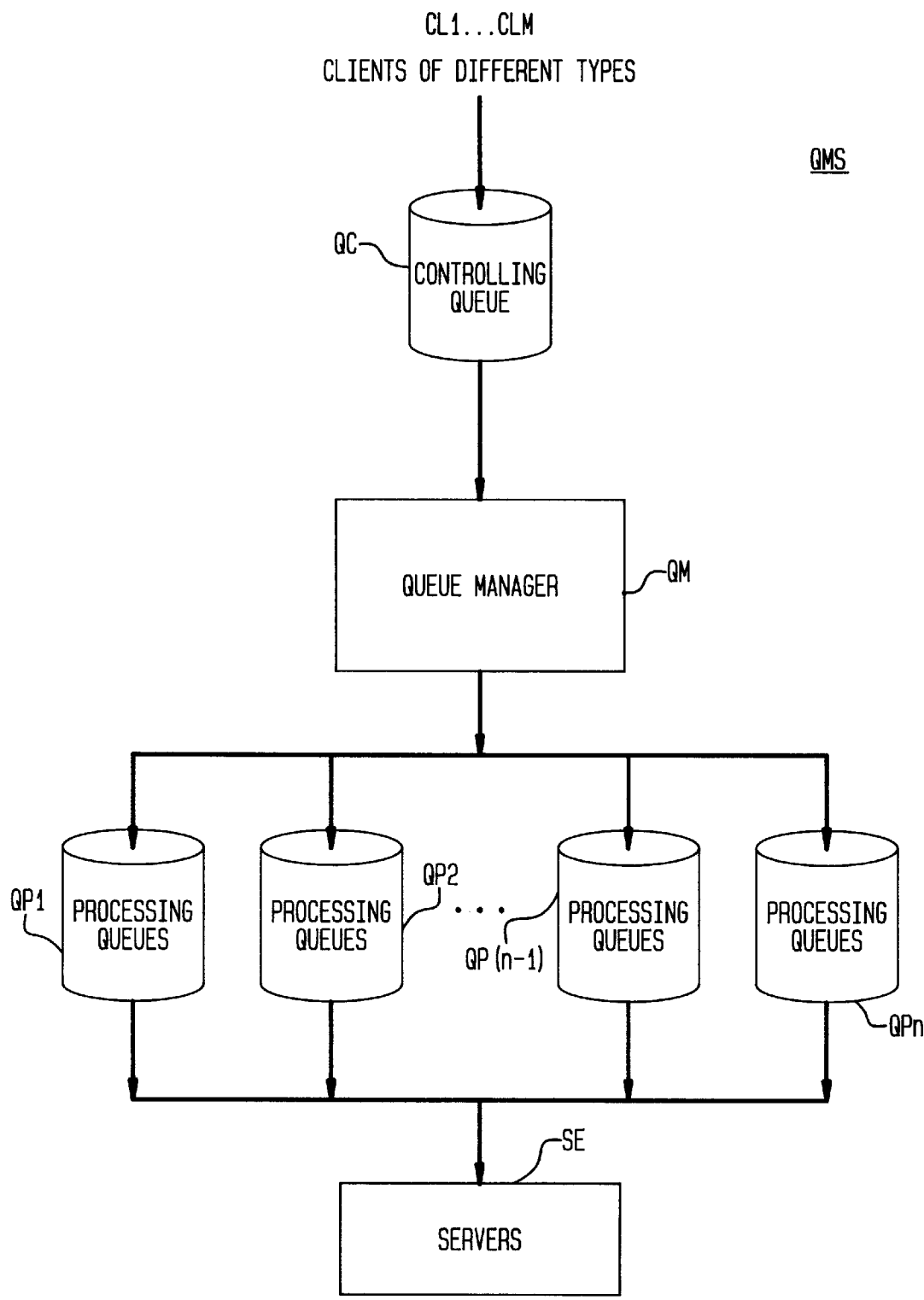
FIG. 1 is a block diagram illustrating a queue management system embodying features of the invention.

In the block diagram of a queue managing system QMS of FIG. 1, a queue manager QM manages a pool of queues, namely a controlling queue QC and a number of processing queues QP1, QP2, ... QP(n−1), QPn. The controlling queue contains a sequence of clients CL1 to CLm of different client types TC1 to TCt requiring varying classes or types of processing. The number n of processing queues QP1 to QPn is less than the number t of the types TC1 to TCt of clients. The number n of processing queues may for example be 50 and the number t of types of clients may for example be 1000.

The controlling queue QC receives all clients of all client types, TC1 to TCt, and holds them in the order that they arrive. The queue manager QM removes the clients from the controlling queue in that same order. Hence, the controlling queue QC is a first in, first out, (FIFO) queue. However, this is only an example and the controlling queue may arrange the clients in another order as desired.

The queue manager QM places each top client in the controlling queue QC into a processing queue QP1 to QPn associated with that type of client. The queue manager establishes the association with the client type on the basis of the client type of the first client which the queue manager places into an empty processing queue QP1 to QPn. This occurs as follows.

Assuming at the outset that all processing queues QP1 to QPn are empty, and the first client in the controlling queue QC is a client of the type TC10, the queue manager places the client in the processing queue QP1. This step allocates or dedicates the processing queue QP1 to the client type TC10. The queue manager thereafter places only client types TC10 into the processing queue QP1 until one of the servers SE empties the processing queue QP1. If the next top client in the controlling queue QC is a type TC143, the queue manager QM places the client of the type TC143 into the processing queue QP2 and hence dedicates or allocates the processing queue QP2 to the client type TC143.

If the next top client in the controlling queue QC is a type TC10, the queue manager places that client together with the other client TC10 into the processing queue QP1 rather than into one of the empty processing queues. Thereafter, the queue manager QM keeps placing the top client into the processing queue which the queue manager has allocated for that type of client, and if no such dedicated processing queue exists, the queue manager places the next top client into an empty processing queue. Each time an empty processing queue receives a client type, the queue manager dedicates that processing queue to that client type.

When the queue manager has dedicated or allocated all processing queues, and the next client being serviced is of a type to which no processing queue is dedicated, or allocated, the queue manager stops distributing clients from the controlling queue QC and waits for the servers SE to empty one of the processing queues QP1 to QPn. The servers SE service the processing queues QP1 to QPn individually either by removing the clients on a one by one basis or in batches. Such servicing may, for example, empty a processing queue and allow the queue manager to deallocate that processing queue and reallocate it to the type of client at the top of the controlling queue QC.

In an alternate embodiment, wherein clients are processed in batches with a maximum size, if the queue manager has dedicated or allocated all processing queues and the next client being serviced is of a type to which no processing queue has been dedicated or allocated, the queue manager examines the controlling queue, and transfers a client later in the controlling queue which matches a processing queue to its processing queue if that transfer will not cause an extra batch to be processed.

The queue manager associates or maintains queue information for each processing queue. This queue information includes the current allocated client type and may contain other fields.

The invention is based on the recognition that although the maximum number of client types TC1 to TCt may be very large, at any one time there are usually only a limited number of clients actually awaiting servicing. Thus, by estimating how many client types exist in this subset of clients actually waiting for servicing, it is possible to allocate enough processing queues QP1 to QPn to hold them.

The queue manager QM does not permanently dedicate any processing queue to a fixed client type but only assigns the processing queues to one client type at a time. A processing queue QP1 to QPn is in use when the queue manager QM assigns it to a client type. Otherwise, the processing queue is empty and available. The processing queue is available for assignment or reassignment only when no client is in that processing queue.

Figure 2:
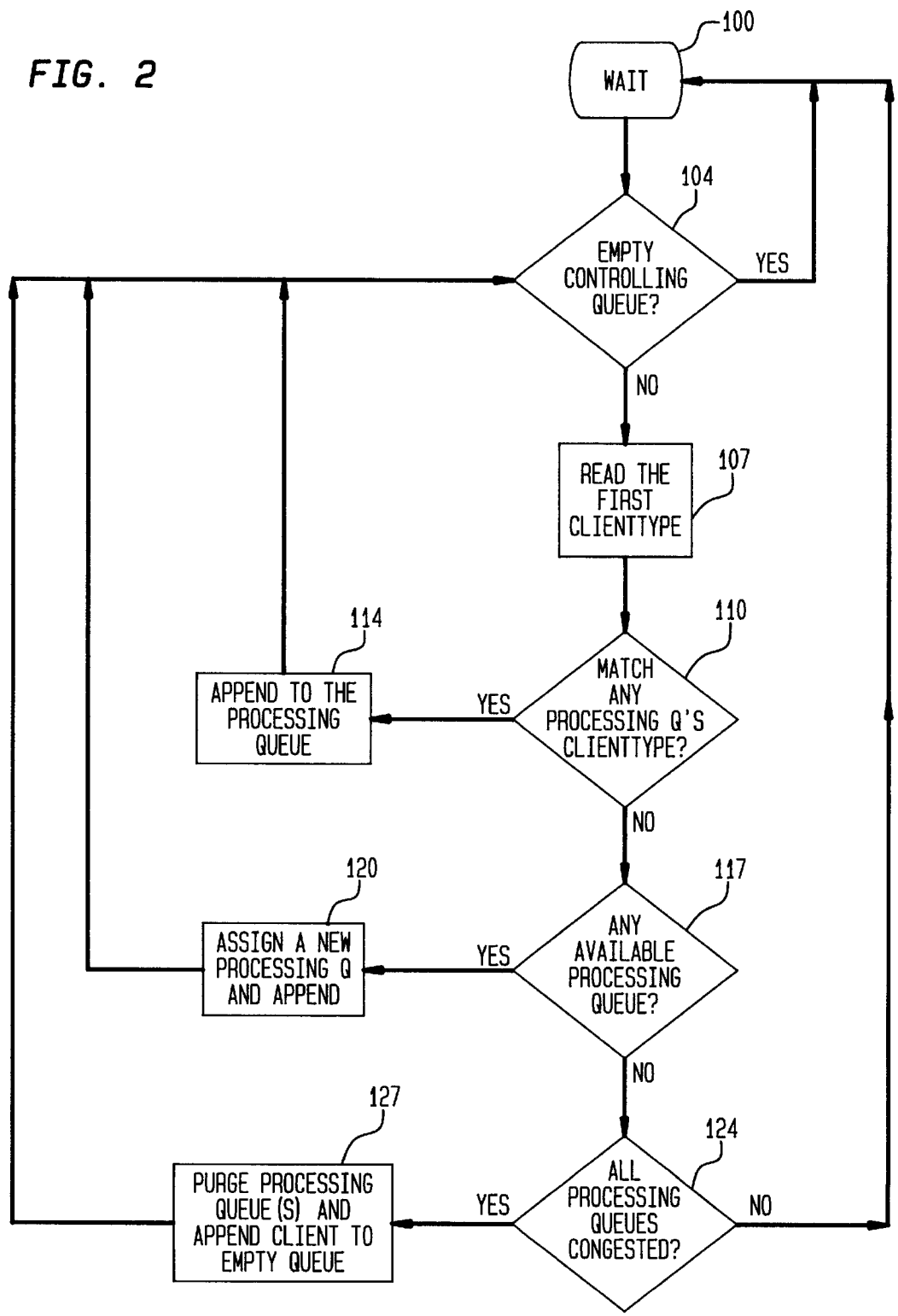
FIG. 2 is a flow chart illustrating operation of the queue management system shown in FIG. 1 and embodying the invention.

FIG. 2 is a flow chart illustrating the operation of the queue management system QMS in FIG. 1. In step 100, the queue manager executes a wait to allow addition of clients to the controlling queue QC by one or more sources. Our processes start with a wait. This seems inefficient, but is actually not. The processes are cyclic, so after the initial wait, the processes proceed as if the wait were at the end. In most cases, when the system starts up, there are no clients, so if the process did not start with a wait, it would fall through to the wait without doing anything. Thus, starting with a wait is usually more efficient. Other implementations could differ. In step 104, the queue manager determines whether the controlling queue is empty. If yes, the queue manager QM returns to wait at step 100. If the controlling queue QC is not empty but contains clients, the queue manager proceeds to step 107 and reads the client type of the first client. In step 110, the queue manager determines whether the client type of the first client matches the client type of any of the processing queues. That is, the queue manager determines from data it maintains whether it has allocated any of the processing queues to the client type found in step 107. In a sense, the queue manager QM is ascertaining whether any of the processing queues QP1 to QPn already contain client types of the type in step 107.

If the client type in step 107 matches a processing queue QP1 to QPn, queue manager QM proceeds to step 114 and removes the top, or first, client from the controlling queue and appends it to the processing queue QP1 to QPn allocated to the same client type. If the client type of the first client in step 107 does not match the client type in any of the processing queues in step 110, the queue manager proceeds to step 117 and asks whether there exist any available processing queues, namely a processing queue QP1 to QPn that is empty. If a processing queue QP1 to QPn is available, i.e., empty, the queue manager QM, in step 120, assigns the available new processing queue to that client type and removes the first client in step 107 and appends it to processing queue. It then returns to step 104 to ask whether the controlling queue QC is empty.

If no processing queue QP1 to QPn is empty, the processing queues may be effectively congested. In step 124, the queue manager QM ascertains whether the servers SE are servicing clients of at least one processing queue, or conversely if something is congesting or blocking all processing queues. If there exists no total block to servicing of the clients, that is, servicing of at least one processing queue is proceeding successfully, the queue manager QM returns the client to wait at step 100 and suspends execution of the entire process to allow time for servicing and emptying of the processing queue so it becomes available.

If the servers are not successfully servicing the clients in any of the processing queues, that is, if something is blocking or congesting servicing of all the processing queues, the queue manager goes to step 127. Here, the queue manager QM purges all of the processing queues QP1 to QPn by emptying the queues and returning the clients they contain to their sources. At this point, these clients are no longer part of the process although the sources may return the clients to the controlling queue. Other actions may be performed to correct the problems causing congestion. Once the queue manager QM has purged a processing queue QP1 to QPn, it can allocate that processing queue for the client type of the top client and transfer the top client in the controlling queue QC to the empty processing queue.

According to an embodiment of the invention, the queue manager QM purges only one or more of the processing queues QP1 to QPn in step 127. According to another embodiment of the invention, in step 127, the queue manager also examines the controlling queue, and returns any clients whose type was allocated to one of the congested processing queues. According to yet another embodiment of the invention, in step 127, instead of returning the clients to their sources, the queue manager returns the clients to the controlling queue. Two concerns must be met for this embodiment to work properly. First, any entries on the controlling queue (i.e., not yet in the processing queue) for a client type assigned to a processing queue must end up after the entries which are returned to the controlling queue from the processing queues, to maintain chronological order for clients of that type. Second, to avoid an infinite loop if there is a permanent problem, each client returned from the processing queue must have a return count associated with it. A maximum return count would be assigned, and if the return count associated with the client reached that maximum value, the client would be returned to its source rather than to the controlling queue.

Figure 3:
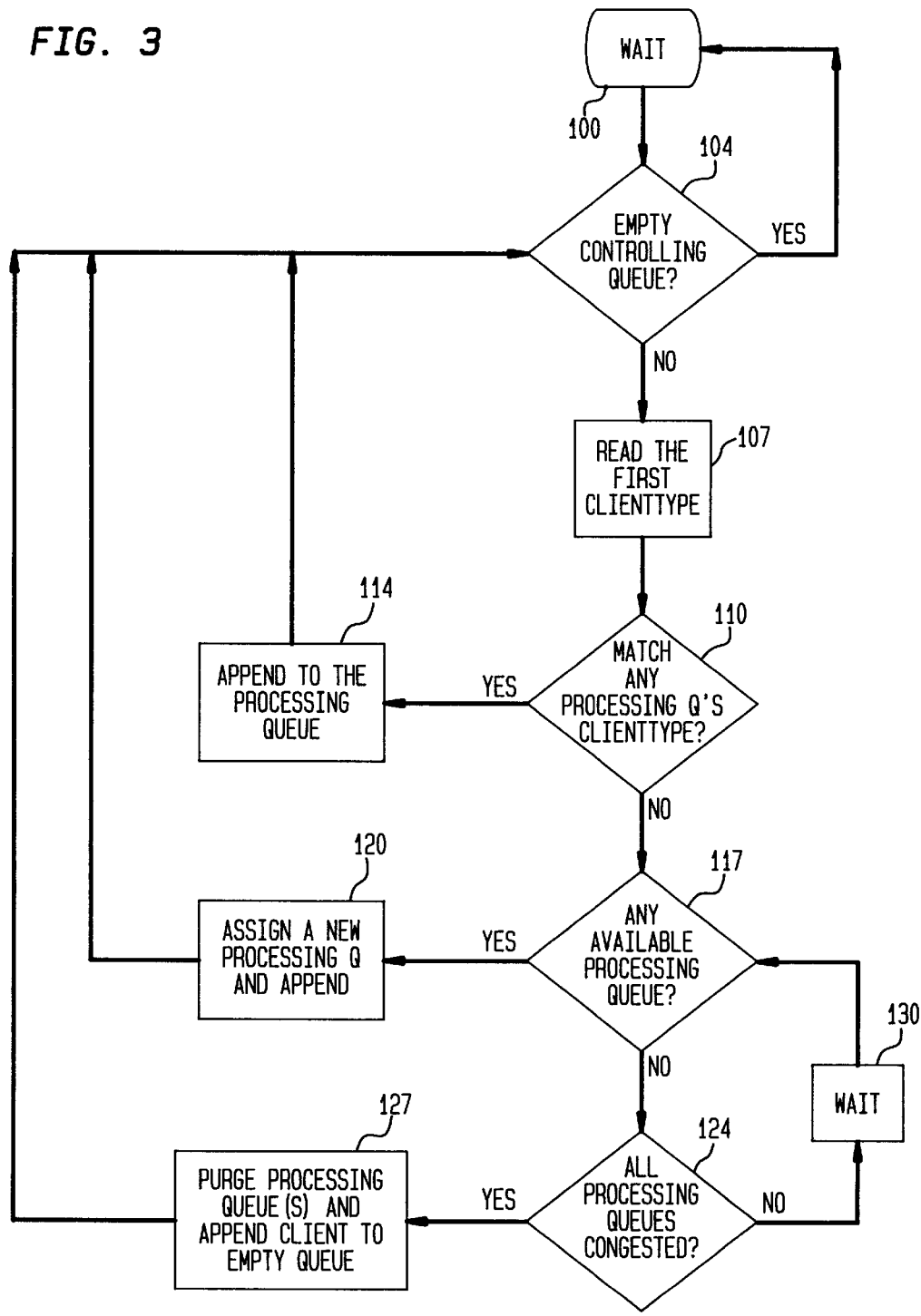
FIG. 3 is a flow chart illustrating another method of operating the system shown in FIG. 1 and embodying the invention.

Another embodiment of the invention appears in the variation of FIG. 2 shown in the flow diagram of FIG. 3. Here, if the answer in step 124 is no, the processing queues are not all congested, the queue manager initiates a wait in step 130. This wait is comparable to the wait in step 100. Thereafter the queue manager returns directly to step 117. The operation in FIG. 3 is more efficient than returning to the step 100 in FIG. 2 if the controlling queue QC were strictly FIFO. In that case nothing could displace the top entry which would fail to match the client type of any processing queue QP1 to QPn. Hence, processing would always proceed through steps 104, 107, and 110 to step 117. In the embodiment of FIG. 3 the queue manager QM proceeds to step 117 directly. According to another embodiment of this invention, the source of a client is notified by the servers SE if the processing of that client fails.

According to another embodiment of the invention, the queue manager QM introduces other queue ordering in the controlling queues QC or QP1 to QPn, i.e., an ordering other than chronological. In one embodiment, the ordering is on the basis of priority. Another is a combination of priority and chronological. Any scalar field is available as priority. That is, the queue manager QM creates an order, either increasing or decreasing, by the value in that scalar field.

In the general case, a processing queue QP1 to QPn may contain many clients with many different priorities at a given time. The same situation may prevail in the controlling queue QC because all clients of all processing queues pass through the controlling queue first. According to one embodiment, the queue manager QM uses a heap or linked list. According to another, it uses a FIFO queue with an auxiliary variable telling the highest priority value currently in the queue. These embodiments make a trade off between the setup time and the efficiency of finding the next client in the process.

Figure 4:
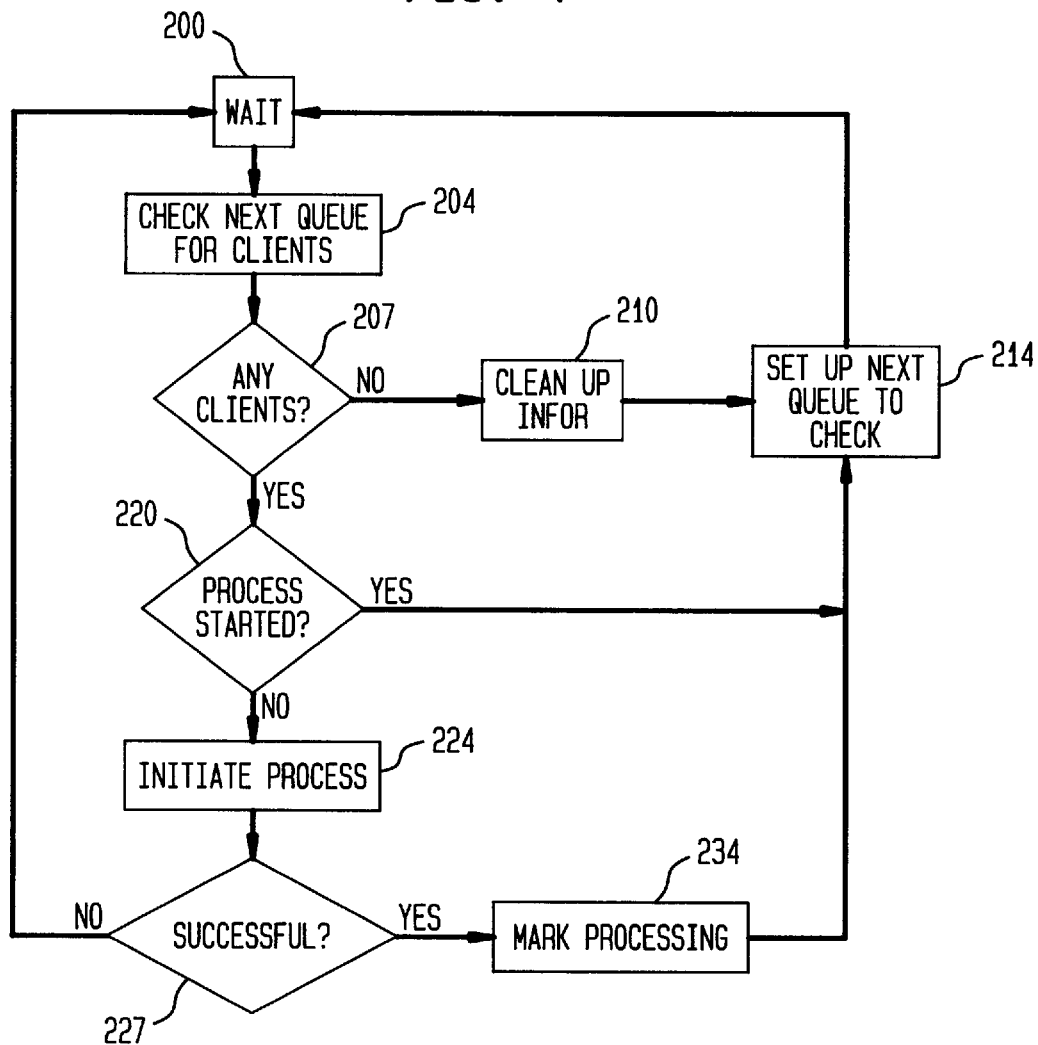
FIG. 4 is a flow chart illustrating the operation of the servers as they initiate servicing of the processing queues in FIG. 1.
Figure 5:
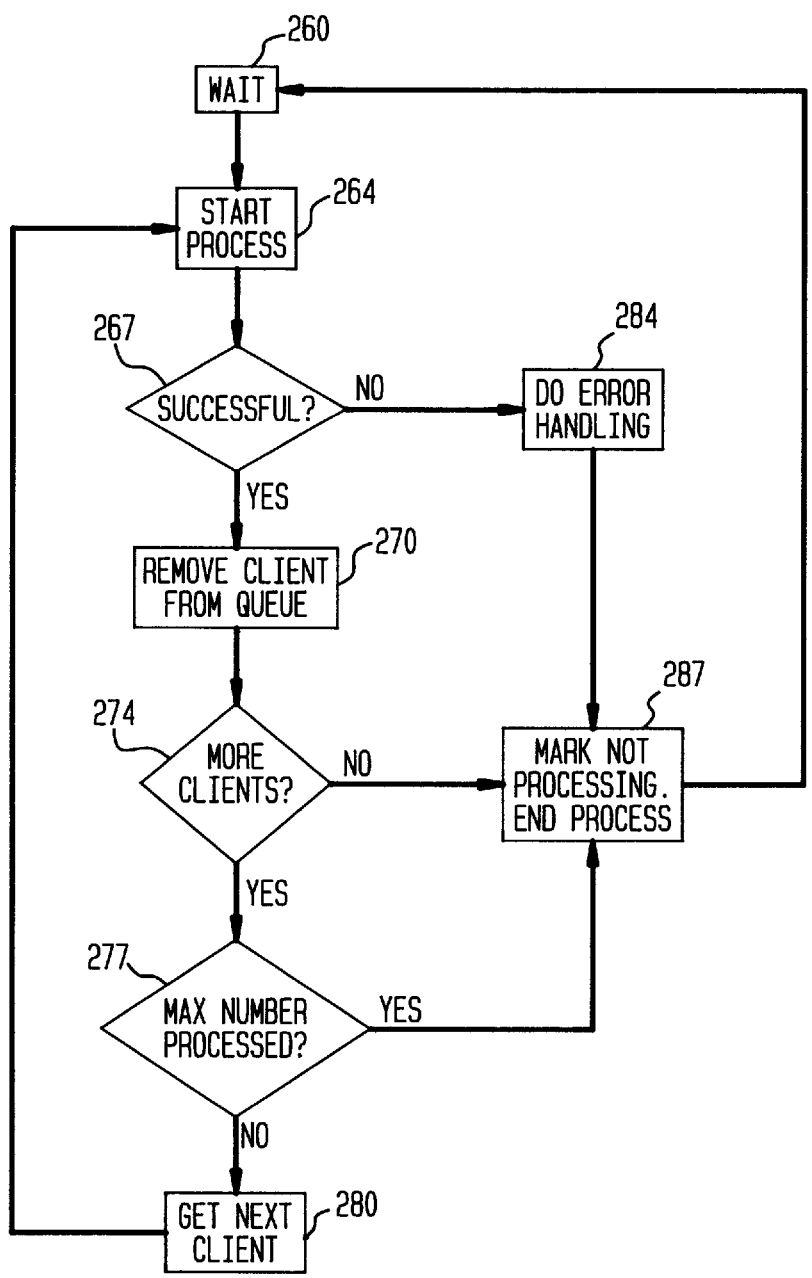
FIG. 5 is yet another flow chart illustrating the operation of the servers in FIG. 1 as they conduct operation on the queues.

The servers SE service the processing queues QP1 to QPn as shown in the flow charts of FIGS. 4 and 5.

FIG. 4 illustrates the initiation of the processing and FIG. 5 illustrates the actual processing. The initiation of the processing and the processing take place separately so that the servers SE can process multiple queues simultaneously. The steps contain a "process started" check to insure that multiple processes are not taking place for the same queue.

Independent of the timing of the operation of the queue manager QM, the servers SE initiate a check of the processing queues QP1 to QPn in a predetermined sequence by first waiting in step 200. Our processes start with a wait. This seems inefficient, but is actually not. The processes are cyclic, so after the initial wait, the processes proceed as if the wait were at the end. In most cases, when the system starts up, there are no clients, so if the process did not start with a wait, it would fall through to the wait without doing anything. Thus, starting with a wait is usually more efficient. Other implementations could differ. In step 204 the servers SE check the next queue for clients ready for processing, and in step 207 ask whether the processing queue has any clients. If the answer is no, the servers SE go to step 210 and clean up or remove any queue information related to clients formerly in that queue and deallocate the queue. The servers then set up to check the next queue in step 214 and return to step 200.

If the answer in step 207 is yes, that the processing queue in question contains clients, the servers go to step 220 to determine if that processing queue has already started and is receiving service. If yes, the servers progress to step 214 to set up to check the next queue. If the answer is no, the servers proceed to step 224 to mark the queue the subject of processing and to initiate servicing of the clients in the processing queue. The servers SE, in step 227, then determine if the servicing has successfully started. If not, the servers SE go back to step 200. If yes, the servers mark the queue as being processed in step 234 and go to step 214 before returning to step 200.

The processing steps after initiation appear in FIG. 5. Here, after a wait in step 260, the servers execute the process in step 264. Step 267 asks whether the process was successful. If yes, the servers remove the clients from the queue in step 270. In step 274 the servers determine if there are more clients in the queue being processed. If not, the servers continue to step 287 where the servers mark the queues as not processing, and the processing ends at that queue. If yes, the servers determine, in step 277, whether the maximum number of clients have been processed. Some servers handle clients in batches, which may or may not have a maximum size. If a server handles clients in batches, and that server handles the maximum number of clients in a batch, then the server will suspend processing until its next pass. If in step 277, the answer is yes, the servers have processed the maximum number. If not, the servers SE get the next client in step 280 and go back to step 264. If, in step 267, the answer is no, the servers go to step 284 to do error handling. According to one embodiment of the invention, error handling involves marking the processing queue for "retry" and specifying a retry time. The queue process controller, when initiating processing (FIG. 4), skips checking the queues marked for retry until the specified retry time. According to an embodiment of the invention, the servers dispense with the error handling.

Figure 6:
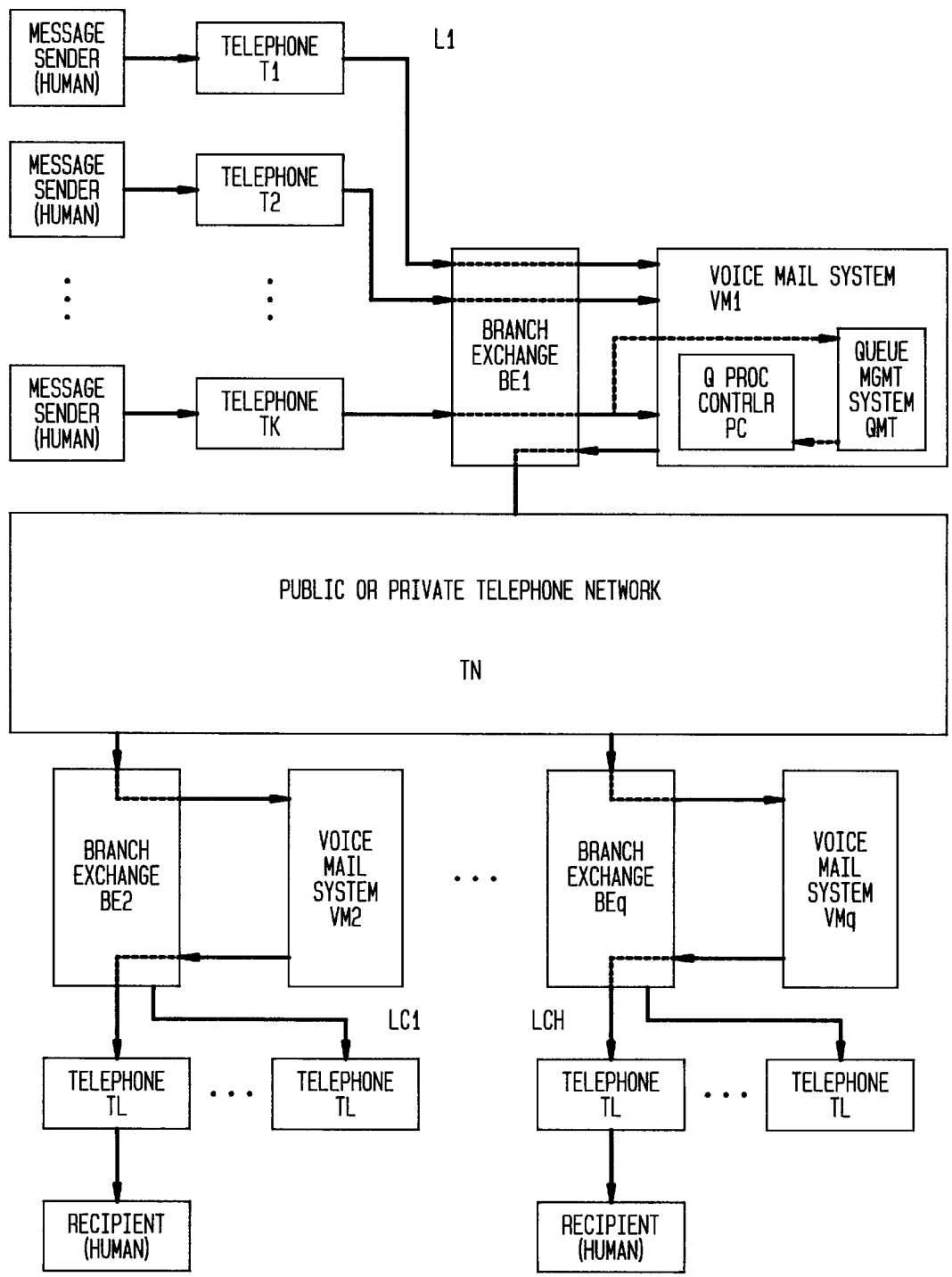
FIG. 6 is a block diagram of a telephone system incorporating an embodiment of the invention.

The block diagram of FIG. 6 illustrates an embodiment of the invention in the environment of a telephone system. Here, the clients CL1 to CLm of FIG. 2 are voice mail messages whose types vary with their destinations. In the telephone system of FIG. 6, a telephone branch exchange BE1 at a user location L1 connects a number of telephones T1, T2, . . . Tk to a public or private telephone network TN and to an associated voice mail system VM1. The telephone network TN connects the branch exchange BE1 to a number of other branch exchanges BE2 . . . BEq, all throughout locations LC1 to LCh possibly remote from the location L1. Each of the branch exchanges BE2 to BEq connects a number of telephones TL to the telephone network TN and to respective associated voice mail systems VM2 to VMq. Each voice mail system VM1 to VMq is of a known type which records messages arriving at its associated branch exchange BE1 to BEq from any of the telephones T1–Tk and TL.

The locations LC1 to LCh of FIG. 6 may be widely spread. The location L1 of the branch exchange BE1 and voice mail system VM1 may for example be in Santa Clara, Calif., while the other locations may for example be in New York, N.Y.; Boston, Mass.; and Nottingham, England, etc.

Figure 7:
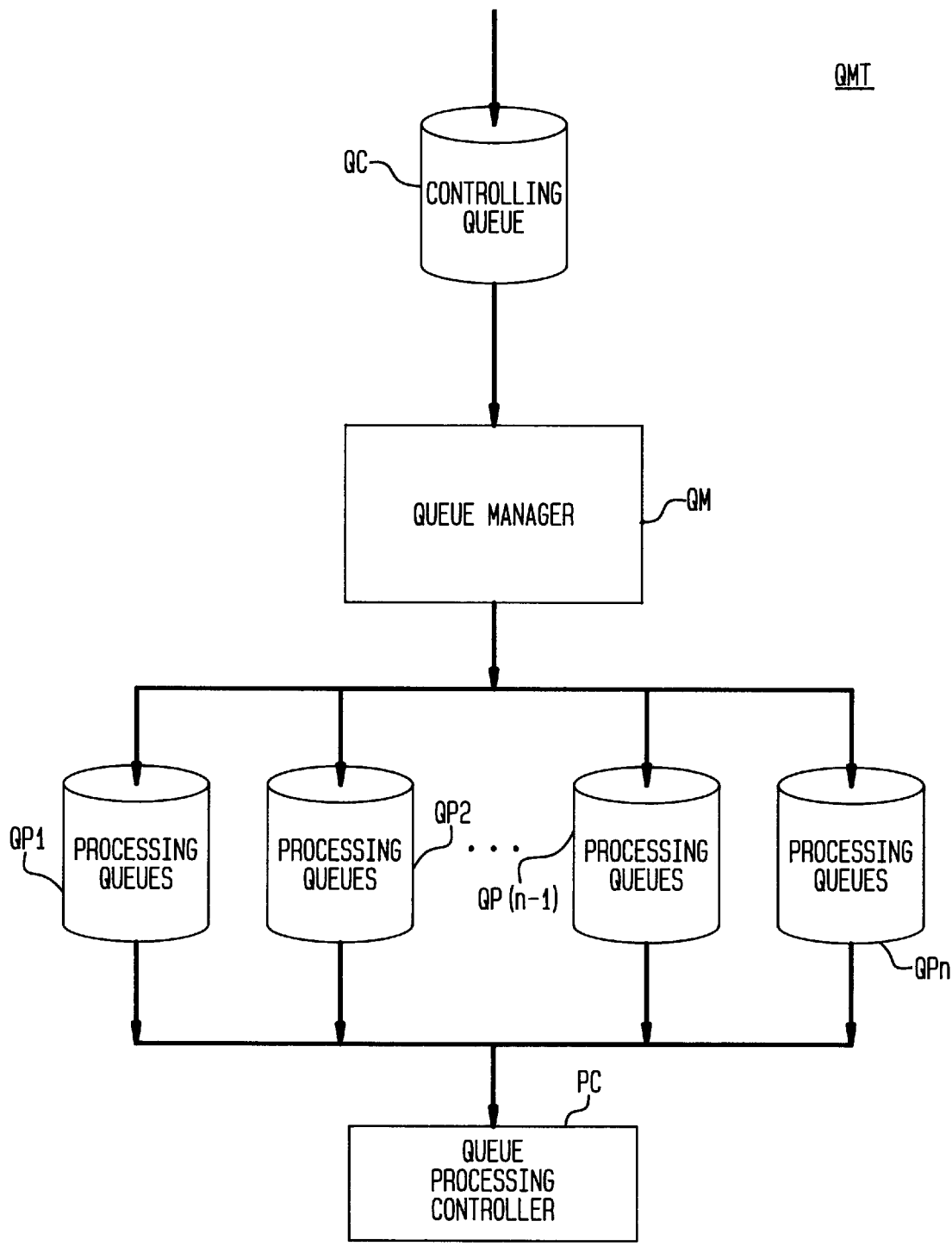
FIG. 7 is a block diagram of a queue management system embodying the invention in the environment of the telephone system in FIG. 6.

The voice mail system VM1 includes a queue management system QMT whose details appear in the diagram of FIG. 7. The voice mail system VM1 receives and stores all messages arriving from branch exchange BE1 either from telephones T1 to Tk at the local location L1 or telephones TL at remote locations LC1 to LCh. These include messages for retrieval by the telephones T1 to Tk and messages for transmission to remote telephones TL. Each message carries a destination code for a particular destination or particular number of destinations. Typically, a destination is another voice mail system such as any one of VM2 to VMq. The queue management system QMT achieves its greatest efficiency when it collects a number of messages for transmission in a batch to a single destination such as a voice mail system. The coding of each message includes the number of the target voice mail system and the mail box number of the particular destination within the target voice mail system. The number of destinations may, for example be 1000.

In the voice mail system VM1, a selector (not shown) separates the recorded messages for transmission to remote telephones TL, i.e., at locations LC1 to LCh outside the branch exchange BE1 of the voice mail VM1, from the recorded messages intended for the local telephones T1 to Tk. The voice mail system VM1 allows each local telephone T1 to Tk to access messages targeted for those local telephones. The queue management system QMT in FIG. 7 receives, as clients, only messages ME1 to MEm coded for transmission to destinations DE1 to DEt at the remote telephones TL and the locations LC1 to LCh outside the branch exchange BE1.

FIG. 7 illustrates details of the queue management system QMT. The latter constitutes the system QMS of FIG. 1 in the context of a telephone system, and particularly a voice messaging system of FIG. 6. FIG. 7 is identical to FIG. 1 except that the clients CL1 to CLm take the specific form of messages ME1 to MEm, types TC1 to TCt take the specific form of destinations DE1 to DEt and the servers SE take the specific form of a queue process controller PC which dials the remote destination and transmits the messages. Like reference characters in FIGS. 1 and 7 represent like parts.

In FIG. 7 the controlling queue QC receives messages ME1 to MEm for all destinations, DE1 to DEt, and holds them in the order that they arrive. The queue manager QM removes the messages from the controlling queue QC in that same order. Hence, the controlling queue QC is a first in, first out, (FIFO) queue. However, this is only an example and the controlling queue may arrange the messages in another order as desired.

In FIG. 7, the queue manager QM places each top message of the controlling queue QC into a processing queue QP1 to QPn associated with one of the destinations. The queue manager QM establishes the association with the destination on the basis of the destination of the first message which the queue manager QM places into an empty processing queue. This occurs as follows.

Assuming at the outset that all processing queues QP1 to QPn are empty, and the first or top message in the controlling queue QC has a destination DE10, the queue manager QM places the message in the processing queue QP1. This step temporarily allocates or dedicates the processing queue QP1 to the destination DE10. The queue manager QM thereafter places only messages with destinations DE10 into the processing queue QP1 until the queue process controller PC empties the processing queue QP1. If the next top message in the controlling queue QC has a destination DE143, the queue manager QM places the message with the destination DE143 into the processing queue QP2 and hence dedicates or allocates the processing queue QP2 to the destination DE143.

If the next top message in the controlling queue QC has a destination DE10, the queue manager places that message after the other message with the destination DE10 into the processing queue QP1 rather than into one of the empty processing queues. Thereafter, the queue manager QM keeps placing the top message having a particular destination into the processing queue which the queue manager QM has allocated for that destination. If no such dedicated processing queue exists, the queue manager places the next top client into an empty processing queue. Each time an empty processing queue receives a message with a particular destination, the queue manager dedicates that processing queue to that destination.

The queue process controller PC cycles through the processing queues at times independent of the action by the queue manager QM. At each processing queue, the queue process controller PC dials the number of the destination of the dedicated processing queue. If the call is completed, the queue process controller PC transmits a batch of the messages in that queue processor via the branch exchange. The maximum number of messages in a batch depends upon the number of messages that the system can transmit at any time which in turn depends upon the protocol that governs transmission of messages.

If the number of messages in the processing queue is less than the maximum in a batch such operation will empty the processing queue. This allows the queue manager QM to deallocate that processing queue and reallocate it to the destination of the message at the top of the controlling queue QC. However, if the number of messages in the processing queue exceeds the maximum of a batch, this procedure suspends the action until the next cycle of the queue process controller PC. The latter always goes on to check the next queue whether successful in sending a message or not.

When the queue manager has dedicated or allocated all processing queues, and the next message on the controlling queue is for a destination to which no processing queue is dedicated or allocated, the queue manager stops distributing messages from the controlling queue QC and waits for operation of the queue process controller PC and the branch exchange BE1 to empty and transmit the messages in one of the processing queues QP1 to QPn.

The queue manager QM and process controller PC associate or maintain queue information for each processing queue. This queue information includes the current allocated destination code and may contain other fields, i.e., whether the processing queue is empty, being currently processed, the number of retries, the processing queue in retry, the next retry time, etc.

The invention is based on the recognition that although the maximum number of destinations DE1 to DEt may be very large such as 1000 or more, at any one time there are usually only a limited number of messages actually awaiting servicing and only a limited number of resources. Thus, by estimating how many destinations exist in this subset of messages actually waiting for transmission, it is possible to allocate enough processing queues QP1 to QPn such as fifty to hold them.

The queue manager does not permanently dedicate any processing queue to a fixed destination but only assigns the processing queues to one destination until the processing queue becomes empty. The queue manager then reallocates the empty queue. A processing queue QP1 to QPn is in use when the queue manager QM assigns it to a destination. Otherwise, the processing queue is empty and available. The processing queue is available for assignment or reassignment only when no message is in that processing queue.

Figure 8:
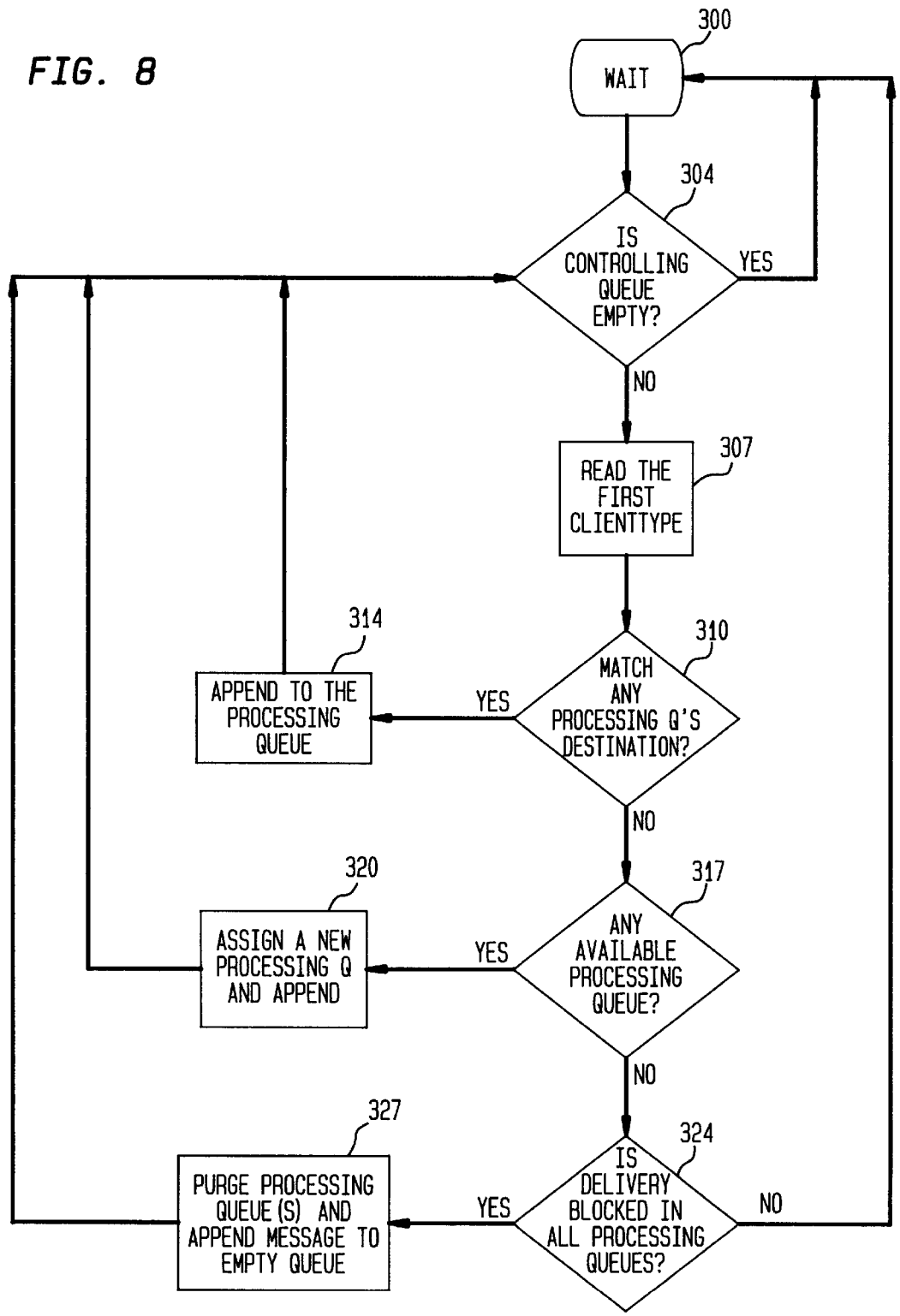
FIG. 8 is a flow chart illustrating steps in the operation of the queue management system shown in FIGS. 6 and 7, and embodying the invention.

FIG. 8 is a flow chart illustrating the operation of the queue management system QMT in FIGS. 6 and 7. The operation is similar to that of FIG. 2 but in the telephone and voice messaging environment. In step 300, the queue manager QM executes a wait to allow addition of messages to the controlling queue QC. Our processes start with a wait. This seems inefficient, but is actually not. The processes are cyclic, so after the initial wait, the processes proceed as if the wait were at the end. In most cases, when the system starts up, there are no clients, so if the process did not start with a wait, it would fall through to the wait without doing anything. Thus, starting with a wait is usually more efficient. Other implementations could differ. In step 304, the queue manager determines whether the controlling queue QC is empty. If yes, the queue manager QM returns to step 300. If the controlling queue QC is not empty but contains messages, the queue manager QM proceeds to step 307 and reads the destination code of the first message. In step 310, the queue manager determines whether the first destination code matches the destination code of any of the processing queues QP1 to QPn. That is, the queue manager QM checks the data it keeps regarding the processing queues to determine if it has allocated any of the processing queues to the destination found in step 307. In a sense, the queue manager QM is ascertaining whether any of the processing queues QP1 to QPn already contain messages to the destination in step 307.

If the destination in step 307 matches a processing queue QP1 to QPn, queue manager QM proceeds to step 314 and transfers the top, or first, message to the processing queue QP1 to QPn allocated to the same destination. If the destination of the first message in step 307 does not match the destination in any of the processing queues in step 310, the queue manager proceeds to step 317 and asks whether there exist any empty processing queues QP1 to QPn. If a processing queue QP1 to QPn is empty, the queue manager QM, in step 320, assigns the empty new processing queue to the destination of that message and transfers the top message in step 307 to that processing queue. It then returns to step 304 to ask whether the controlling queue QC is empty.

The lack of matching or empty processing queues QP1 to QPn may suggest congestion of the processing queues. In step 324, the queue manager ascertains from checking the results of the queue process controller PC if something is congesting or blocking delivery of messages from all the processing queues. If there is no total block to,delivery, that is, delivery from at least one processing queue is proceeding successfully, the queue manager QM leaves the message in the controlling queue to wait in step 300 and suspends execution of the entire process to allow time for a processing queue to empty. If something is blocking delivery of messages from all the processing queues, the queue manager QM goes to step 327. The queue manager QM purges one or more of the processing queues QP1 to QPn by emptying the queue and returning messages to their source. Other actions may be performed to correct the problems causing congestion.

This purging process returns the messages to their senders. Once the queue manager has purged a processing queue QP1 to QPn, it can transfer the top message from the controlling queue to the emptied processing queue, and thus allocate that processing queue to the destination of that message. According to another embodiment of the invention, the queue manager QM purges all the processing queues QP1 to QPn.

In FIG. 8, the queue manager QM can also introduce other queue ordering in the controlling queues QC or QP1 to QPn, i.e., an ordering other than chronological. Any scalar field is available as priority. That is, the queue manager QM creates an order, either increasing or decreasing, by the value in that scalar field.

In the general case, a processing queue QP1 to QPn may contain many messages with many different priorities at a given time. The same situation may prevail in the controlling queue QC because all messages of all processing queues pass through the controlling queue first.

Figure 9:
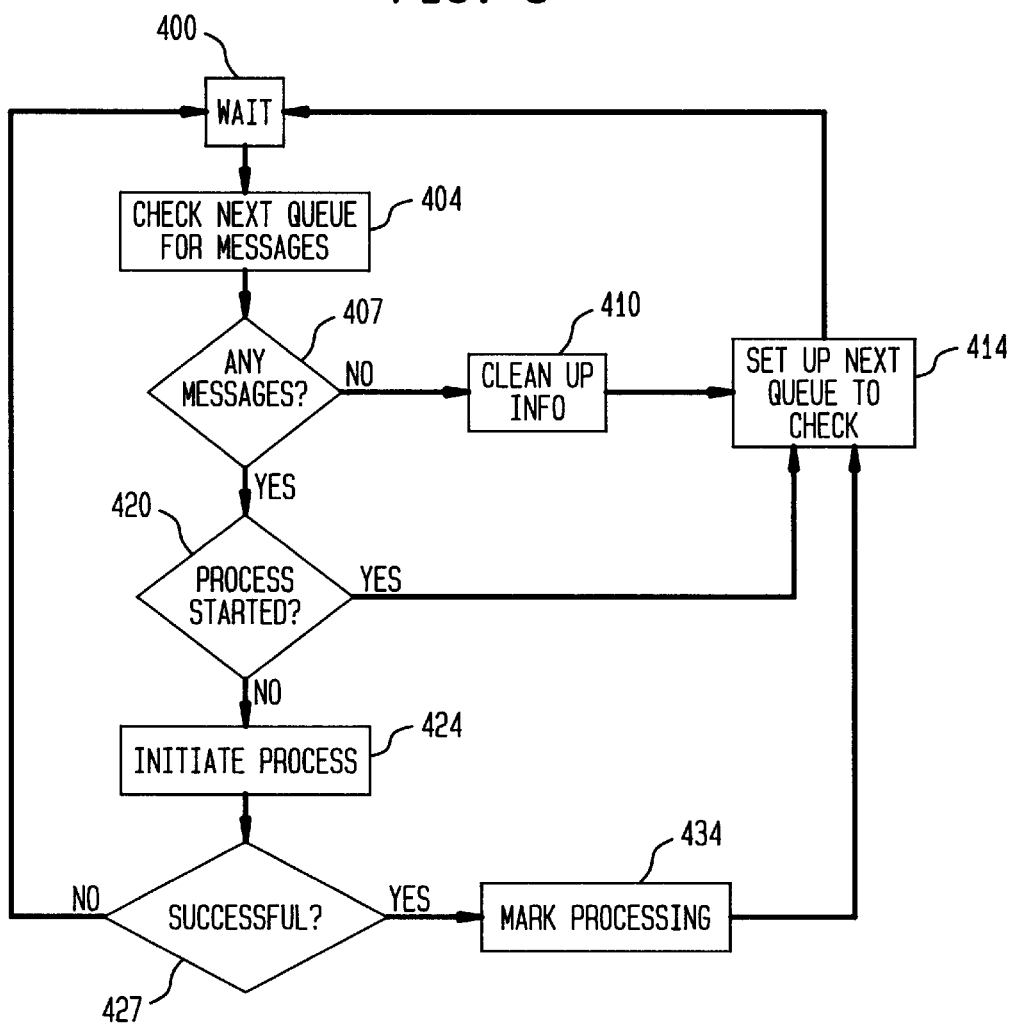
FIG. 9 is a flow chart illustrating further steps in the method of operating the system shown in FIGS. 6 and 7 and embodying the invention.
Figure 10:
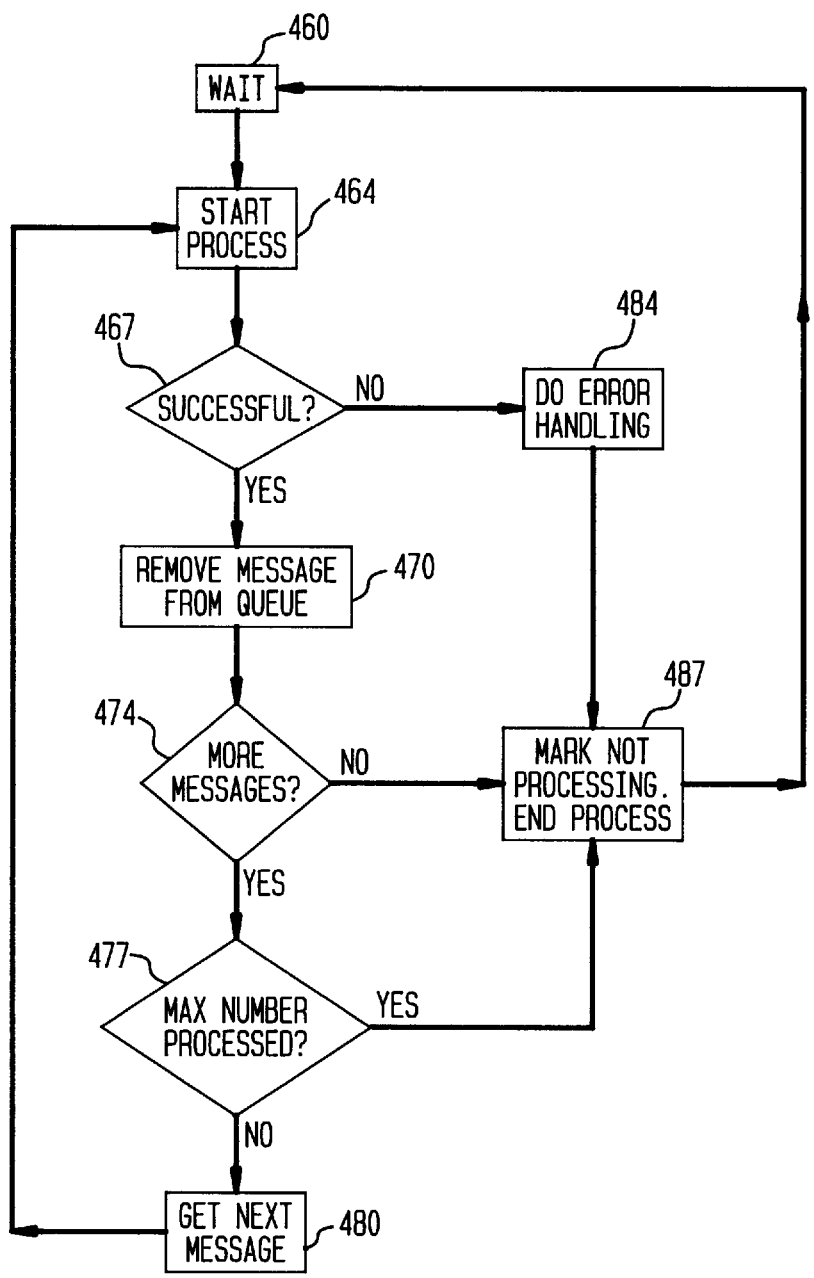
FIG. 10 is a flow chart illustrating further steps in operating the system shown in FIGS. 6 and 7 and embodying the invention.

The queue process controller PC directs the branch exchange BE1 to transmit the messages from the processing queues QP1 to QPn to their respective destinations as shown in the flow chart of FIGS. 9 and 10. In FIGS. 9 and 10, as in FIGS. 4 and 5, the queue process controller PC divides the processing of the messages into two separate tasks so as to make it possible to use multiple queues simultaneously. FIG. 9 illustrates the manner of initiating the transmission and FIG. 10, the manner of transmitting the messages of FIG. 9.

The steps of FIG. 9 are independent of the timing of the operation of the queue manager QM. Here, the queue process controller PC initiates a check of the processing queues QP1 to QPn in a predetermined sequence, one at a time and, between queue checks, waits as shown in step 400. Our processes start with a wait. This seems inefficient, but is actually not. The processes are cyclic, so after the initial wait, the processes proceed as if the wait were at the end. In most cases, when the system starts up, there are no clients, so if the process did not start with a wait, it would fall through to the wait without doing anything. Thus, starting with a wait is usually more efficient. Other implementations could differ. In step 404 the queue process controller PC checks the next queue for messages ready for transmission, and in step 407 asks whether the processing queue has any messages. If the answer is no, the queue process controller PC goes to step 410 and cleans up or removes any queue information related to messages formerly in that queue and deallocates the queue. The queue process controller PC then sets up to check the next queue in step 414 and returns to step 400.

If the answer in step 407 is yes, there are messages in the processing queue in question, the queue process controller PC goes to step 420 to determine if the branch exchange BE1 is already transmitting the messages from that processing queue. If yes, the queue process controller PC goes to step 414 to set up to check the next queue. In an embodiment using retries for error handling, step 414 may skip any queue in retry whose retry time has not been reached. If the answer is no, the queue process controller PC proceeds to step 424 to initiate the processing by marking the queue as the subject of transmission and requesting the branch exchange BE1 to obtain a channel for delivering the message. The queue process controller PC, in step 427, determines if the channel was successfully obtained. If not, the queue process controller PC returns to step 400. If yes, the queue process controller PC marks the queue for processing in step 434 and returns to step 414 and then to step 400.

The processing steps appear in FIG. 10. Here, after a wait in step 460, the process controller PC in step 464 directs the branch exchange BE1 to dial the number of the destination of the messages in the processing queue and to transmit the first message of the processing queue through the channel it has made available. Our processes start with a wait. This seems inefficient, but is actually not. The processes are cyclic, so after the initial wait, the processes proceed as if the wait were at the end. In most cases, when the system starts up, there are no clients, so if the process did not start with a wait, it would fall through to the wait without doing anything. Thus, starting with a wait is usually more efficient. Other implementations could differ. In step 467, the process controller PC asks whether the transmission was successful. If yes, in step 470, queue process controller PC removes the message from the queue. In step 474, the process controller PC checks to see if there are any more messages in the processing queue. If the answer is yes, in step 477, the queue process controller asks whether the exchange BE1 has transmitted the maximum number of messages for each transmission. If not, in step 480, the queue process controller PC gets the next message and restarts the process in step 464.

Step 484 is optional and may be eliminated. Step 484 operates if in step 467 the branch exchange BE1 does not complete the call, i.e., the process is unsuccessful. The queue process controller PC updates queue information associated with the queue to reflect the situation.

If message delivery in step 467 is not successful, several other embodiments of the invention perform error handling in step 484. On one embodiment, the queue process controller removes the message from the queue, returns it to the source, and ends servicing of the processing queue until the next cycle of the processing controller. In another embodiment, the queue process controller removes all the messages from the queue and returns them to their sources.

In another embodiment, the queue process controller leaves the message in the queue but sets a time to try again. The next attempt at message delivery from this queue will be considered a retry. The queue process controller PC keeps track of the number of retries. The queue manager makes note that the queue is in retry and monitors to be sure that not all queues are in retry when it checks for queue congestion at step 324 in FIG. 8.

If the message still does not go through after making retries, the queue process controller PC returns that message (and possibly all others to that destination) to its source.

When cycling through the queues to start a process, the queue process controller skips queues marked for retry until the time to process.

After completing error handling in step 484 the queue process controller PC then proceeds to step 487 to mark the queue as not processing and ends the process for that queue. It then waits for initiation of processing of the next queue by steps of FIG. 9.

If in step 474 the queue process controller PC determines that there are no more messages in the queue, or in step 477 determines that the exchange BE1 has processed the maximum number of messages, the controller PC proceeds to step 487.

If the call goes through successfully, the queue process controller PC delivers a batch of a predetermined maximum number of messages and the delivery ends. The predetermined number in the batch may not allow delivery of all messages in a processing queue. However, queue process controller PC can deliver more during its next cycle of checking the processing queues.

Figure 11:
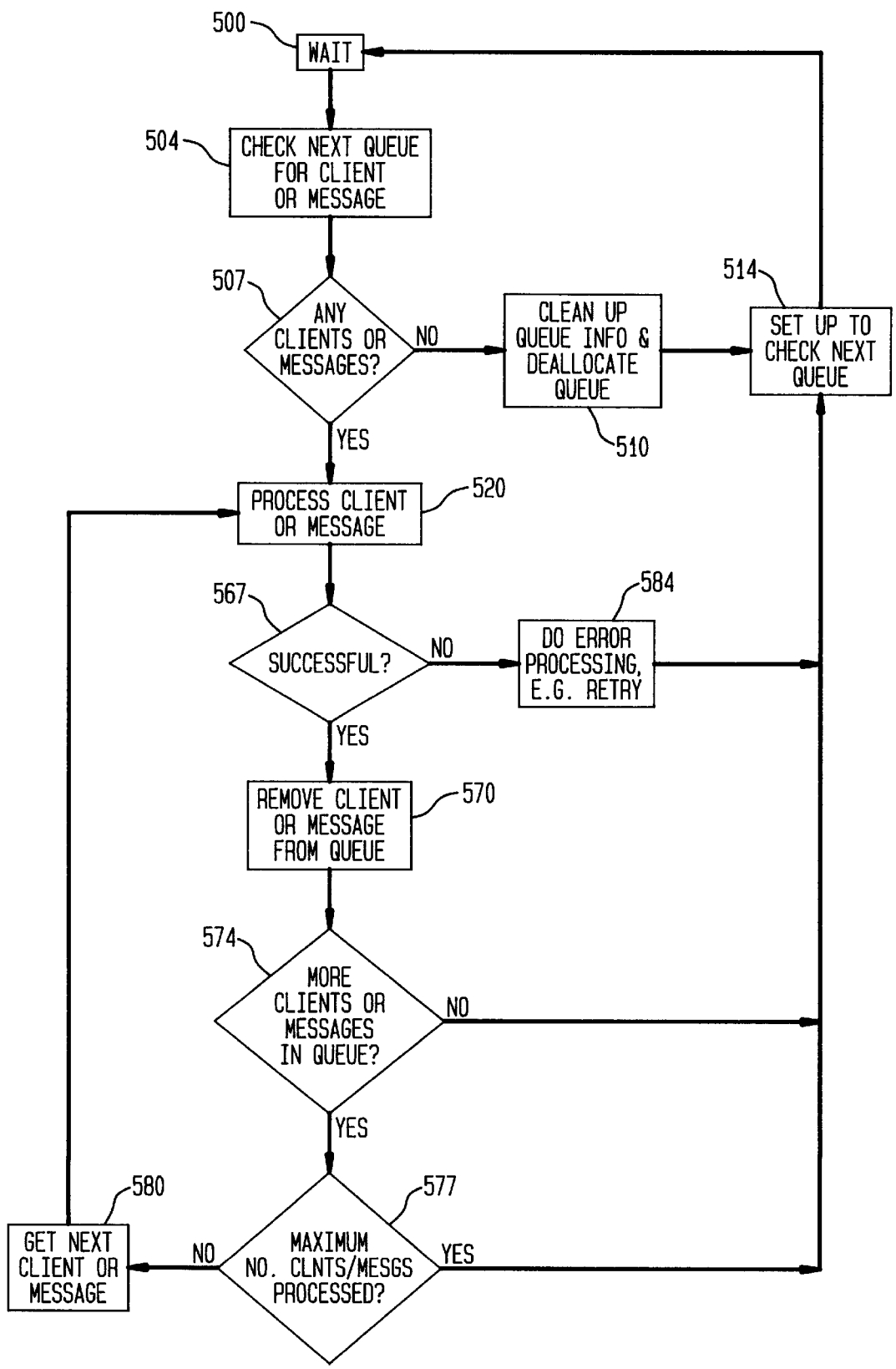
FIG. 11 is yet another flow chart illustrating another operation of a queue processing controller shown in FIGS. 6 and 7 and embodying the invention.

The process in FIG. 11 is a simplified version of that in FIGS. 9 and 10. In this embodiment, processing of one queue must be completed before processing of another queue begins. Here, again, the steps of FIG. 11 are independent of the timing of the operation of the queue manager QM. Here, the queue process controller PC initiates a check of the processing queues QP1 to QPn in a predetermined sequence, one at a time and, between queue checks, waits as shown in step 500. Our processes start with a wait. This seems inefficient, but is actually not. The processes are cyclic, so after the initial wait, the processes proceed as if the wait were at the end. In most cases, when the system starts up, there are no clients, so if the process did not start with a wait, it would fall through to the wait without doing anything. Thus, starting with a wait is usually more efficient. Other implementations could differ. In step 504 the queue process controller PC checks the next queue for messages ready for transmission, and in step 507 asks whether the processing queue has any messages. If the answer is no, the queue process controller PC goes to step 510 and cleans up or removes any queue information related to messages formerly in that queue and deallocates the queue. The queue process controller PC then sets up to check the next queue in step 514 and returns to step 500.

If the answer in step 507 is yes, there are messages in the processing queue, the queue process controller PC directs the branch exchange BE1 to dial the number of the destination of the messages in the processing queue and to transmit the first message of the processing queue through the channel it has made available. In step 567, the process controller PC asks whether the transmission was successful. If yes, in step 570, queue process controller PC removes the message from the queue. In step 574, the process controller PC checks to see if there are any more messages in the processing queue. If the answer is yes, in step 577, the queue process controller asks whether the exchange BE1 has transmitted the maximum number of messages for each transmission. If not, in step 580, the queue process controller PC gets the next message and restarts the process in step 520.

If step 574 determines that there are no more messages in the queue, or step 577 indicates that the exchange BE1 has processed the maximum number of messages, the controller PC proceeds to step 514.

Step 584 is optional and may be eliminated. If in step 567, the branch exchange BE1 does not complete the call, i.e., the process is unsuccessful, step 584 sets up queue information to reflect the situation. In step 584, the next attempt at message delivery is a retry. If the message still does not go through after making retries, the queue process controller PC returns that message and possibly all others to that destination.

If the call goes through successfully, the queue process controller PC delivers a batch of a predetermined maximum number of messages and the delivery ends. The predetermined number in the batch may not allow delivery of all messages in a processing queue. However, queue process controller PC can deliver more during its next cycle of checking the processing queues.

The invention has the advantage of providing efficient service even though the maximum number of destinations may be very large such as one thousand. The invention is based on the recognition that at any one time there are usually only a limited number of destinations actually waiting to be serviced. Thus, only a small number of processing queues QP1 to QPn such as 50 can service a large number of destinations. The controlling queue serves as an overflow queue if the number of processing queues is insufficient.

The invention offers the advantage of preventing the messages for the busiest destinations from monopolizing the processing queues. This arises because each message must wait its turn in the controlling queue QC.

According to the invention, the queue manager does not permanently dedicate processing queues QP1 to QPn to fixed destinations but dedicates them temporarily to a particular destination. One of the processing queues QP1 to QPn is in use when dedicated to one destination. Once emptied, the processing queue becomes available for allocation to another destination. Also, the queue manager may add messages to a processing queue while processing is taking place.

According to another feature of the invention, the process controller PC receives other information to determine when to trigger the activities of a processing queue. For example, delivery time and delivery count determines when and if the delivery process should make an attempt to send a message to a destination, how many attempts have been made, and if another retry is pending.

According to another embodiment of the invention, the controlling queue QC uses ordering methods other than chronological for the queues. In one instance, the control QC places the messages on a priority basis or a combination of priority and first-in first-out basis. The controlling queue QC can use any scalar field as a priority and process messages in order of increasing or decreasing value in that field. According to still another embodiment of the invention, the controlling queue QC orders many different priorities in one of the processing queues QP1 to QPn at a given time. For efficiency, a heap or linked list may replace the first-in first-out queue. Another scheme uses the first-in first-out queue with an auxiliary variable telling the highest priority value currently in the queue. This results in a trade off between the set up time and the efficiency of finding the next message to process. According to another embodiment of the invention, the controlling queue manager QM uses different processing queues for clients of the same type but different priorities.

According to an embodiment of the invention the queue manager QM handles congestion in the processing queues QP1 to QPn as follows. The queue manager QM suspends any message movement out of the controlling queue QC until at least one of the processing queues QP1 to QPn becomes available. Alternately, the queue manager QM purges any of processing queues QP1 to QPn that has a processing problem based upon the queue information associated with each processing queue. This makes some of the processing queues QP1 to QPn available during congestion and speeds the overall processing.

Yet another method of treating congestion involves waiting until all the processing queues QP1 to QPn have processing problems and purge all the processing queues QP1 to QPn at once. This makes all of the processing queues QP1 to QPn available.

In the telephone or voice messaging environment, the invention assigns messages only to processing queues which are free of messages targeted for other destinations. Thus messages for the same destination go to the same processing queue even though there can exist a virtually unlimited number of destinations and only a limited number of queues. The sources put messages in the controlling queue QC first and the queue manager QM moves them to one of the processing queues for further processing. This isolates knowledge of the processing queues QP1 to QPn to the queue manager QM and the process controller PC. External processes which send messages to the controlling queue know only the controlling queue QC.

The invention allows concurrent processing of messages with different destinations and keeps a chronological order for those messages with the same message destination. The invention dynamically uses a queue for holding messages of the same message type, e.g. destination. One of the processing queues QP1 to QPn can hold messages for one destination at one time and messages for another destination at another time. The queue manager QM knows that the processing queue is either in use, in a retry condition, or empty and available.

The invention permits ordering messages by priority in addition to or instead of by chronology. The invention uses a limited number of queues to allow concurrent servicing of large numbers of destinations. There is in fact no limitation on the different destinations. Messages for the same destination wait in the same processing queue. The messages in the same processing queue are normally in chronological order unless an alternative approach is desired. Concurrent processing of different messages is easily available. The system dynamically allocates processing queues QP1 to QPn to each destination and deallocates them from such destination. The invention associates common attributes relevant to the processing of a given message with the corresponding queue for ease of processing.

Processing of multiple messages for the same destination becomes more efficient than for a single queue system as well as for previous multiple queue systems. The invention allows for great flexibility in processing.

If message delivery is not successful, several other embodiments of the invention perform error handling. On one embodiment, the queue process controller or the queue manager removes the message from the queue, returns it to the source, and ends servicing of the processing until the next cycle of the processing controller. In another embodiment, the queue process controller or the queue manager removes all the messages. In another embodiment, the queue process controller or the queue manager leaves the message in the queue but sets a time to try again. When cycling through the queues to start a process, the queue process controller skips the queue until the time to process.

While embodiments of the invention have been described in detail, it will be evident to those skilled in the art that the invention may be embodied otherwise without departing from its spirit and scope. For example, although the queue manager has been described in terms of a voice mail message system, those or ordinary skill in the art should readily appreciate that the method and apparatus described above also apply to all other types of store-and-forward messaging systems. For example, embodiments of the present invention apply as well to store-and-forward messaging systems for, for example, facsimile messages (FAX), electronic mail messages (E-mail), video messages, as well as multimedia messages of all sorts.

What is claimed is:

1. A queue management system for a plurality of clients, each having a client type, comprising:

a controlling queue means for queuing the plurality of clients;

a processing queue means for queuing clients, wherein at any time said processing queue means queues only clients having a single client type;

a server means, coupled to the processing queue means, for processing clients queued by said processing queue means; and a queue manager, coupled to the controlling queue means and the processing queue means, for transferring each client queued by the controlling queue means to said processing queue means;

wherein the queue manager queues one or more clients of a first type to said processing means until said processing means is empty and then queues at least one client of a second type to said processing means.

2. The system as in claim 1 further including plural processing queue means wherein at any time each of said plural processing queue means queues only clients having a single client type.

3. The system as in claim 2, wherein the queue manager includes:

means for determining whether a client has a first client type;

means for determining whether any processing queue is currently queuing clients of the first client type; and means for transferring a client having a first client type to a processing queue means that is currently queuing clients of the first client type.

4. The system as in claim 3, wherein the queue manager further includes:

searching means for searching for an empty processing queue means; and means for transferring the client having the first client type to the empty processing queue means.

5. The system as in claim 4, wherein the queue manager further includes:

ascertaining means for ascertaining whether any processing queue means is being emptied; and emptying means for emptying at least one processing queue means and for transferring the client having the first client type from the controlling queue means to the emptied processing queue means.

6. The system as in claim 5, wherein the emptying means empties the at least one of the processing queue means by purging all clients queued within the at least one of the processing queue means.

7. The system of claim 6 wherein the emptying means further comprises means for returning to the controlling queue means clients that have been purged from the processing queue means.

8. The system as in claim 5, wherein the queue manager further includes:

means for suspending the purging of clients from the processing queue means if all of the plural processing queue means have been allocated and at least one processing queue means is being emptied.

9. The system of claim 4 wherein the queue manager further comprises:

means for ascertaining, when there is no empty processing queue means, whether any processing queue means is being emptied by the server means; and means for emptying, if no processing queue means is being emptied, at least one of the processing queue means by purging from said at least one of the processing queue means all clients of a second client type.

10. The system as in claim 2, further comprising:

processing means for processing clients in each of the processing queue means in turn as a batch;

means for determining a maximum number of clients allowed in a batch; and means for determining when the maximum number has been reached.

11. The system as in claim 10, wherein the processing means includes:

means for checking whether any clients are queued within a first processing queue means;

means for examining the first processing queue means to determine whether clients queued in the first processing queue means are being processed; and means for initiating processing of clients queued in the first processing queue means when the clients queued in the first processing queue means are not being processed.

12. A queue management method for servicing a plurality of clients, each client from the plurality of clients having a client type, the system including a controlling queue for queuing clients and a plurality of processing queues, the queue management method comprising the steps of:

(a) transferring the clients to the controlling queue; and (b) transferring the clients from the controlling queue to the plurality of processing queues, wherein all clients queued within a particular processing queue at any one time have the same client type, including the following substep:

(b.1) processing a first client having a first client type when no processing queue from the plurality of processing queues is currently queuing clients of the first client type by allocating an empty processing queue to queue the first client, wherein the empty processing queue most recently queued clients of a second client type.

13. A method as in claim 12, wherein substep (b.1) includes retaining, when there is no processing queue queuing the clients of the first client type and no processing queue is empty, the first client in the controlling queue until a processing queue is empty.

14. The method as in claim 12, wherein step (b) additionally includes the following substeps:

determining that the first client has the first client type;

determining whether any of the processing queues is currently queuing clients having the first client type; and transferring the first client to a first processing queue that is currently queuing clients having the first client type.

15. The method as in claim 14, wherein substep (b.1) additionally includes the following substeps:

searching for an empty processing queue when there is no processing queue that is currently queuing clients having the first client type; and transferring the first client to the empty processing queue when the empty processing queue is found.

16. The method as in claim 14, wherein step (b) additionally includes the following substeps:

ascertaining, when there is no empty processing queue, whether any processing queue is being emptied;

emptying, when no processing queue is being emptied, at least one of the processing queues by purging all clients from the at least one processing queue; and transferring the first client from the controlling queue to the at least one of the emptied processing queues.

17. The method as in claim 16, wherein step (b) additionally includes the following substep:

suspending purging of clients from the controlling queue if all processing queues have been allocated and at least one processing queue is being emptied.

18. The method as in claim 12, further comprising the following steps:

(c) processing clients in each of the processing queue in turn as a batch;

(d) determining a maximum number of clients allowed in a batch; and (e) determining when the maximum number has been reached.

19. The method as in claim 18, wherein step (c) includes:

checking whether any clients are queued in a first processing queue;

examining the first processing queue to determine whether clients queued in the first processing queue are being processed; and initiating processing of the clients queued in the first processing queue when the clients queued in the first processing queue are not being processed.

20. A store-and forward messaging system comprising:

a controlling queue means for queuing a plurality of messages for transmission to one of a number of target destinations, each message from the plurality messages having a destination code selected from a plurality of destination codes;

a processing queue means for queuing messages, wherein at any time said processing queue means queues only messages having a single destination;

a server means, coupled to the processing queue means, for processing messages queued by the processing queue means; and a queue manager, coupled to the controlling queue means and the processing queue means, for transferring each of the messages queued by the controlling queue means to one of the processing queue means;

wherein the queue manager queues one or more messages having a first destination code to said processing queue means until said processing queue means is empty, and then queues at least one message having a second destination code to said processing queue means.

21. The system as in claim 20 further including plural processing queue means wherein at any time each of said plural processing queue means queues only messages having a single destination code.

22. The system as m claim 20, wherein the queue manager further comprises means for, when there is no processing queue means queuing the messages of the first destination code and no processing queue means from the plurality of processing queue means is empty, retaining the first message in the controlling queue means until a processing queue means is empty.

23. The system as in claim 20, wherein the queue manager includes:

means for determining whether the first message has the first destination code;

means for determining whether any of the processing queue means is currently queuing messages having the first destination code; and means for transferring the first message to a first processing queue means that is currently queuing messages having the first destination code.

24. The system as in claim 23, wherein the queue manager further includes:

searching means for searching for an empty processing queue means when there is no processing queue means from the plural processing queue means currently queuing messages having the first destination code; and means for transferring the first message to the empty processing queue means when the empty processing queue means is found.

25. The system as in claim 24, wherein the queue manager further includes:

ascertaining means for ascertaining, when there is no empty processing queue means, whether any processing queue means is being emptied; and emptying means for emptying at least one processing queue means by purging messages from said at least one processing queue means, and for transferring the first message from the controlling queue means to said emptied processing queue means.

26. The system as in claim 25, wherein the queue manager further includes:

means for suspending purging the messages from the controlling queue means if all processing queue means have been allocated and at least one processing queue means is being emptied.

27. The system as in claim 20, further comprising:

processing means for processing messages in each of the processing queue means in turn as a batch;

means for determining a maximum number of messages allowed in a batch; and means for determining when the maximum number has been reached.

28. The system as in claim 27, wherein the processing means includes:

means for checking whether any messages are queued within a first processing queue means;

means for examining the first processing queue means to determine whether messages queued in the first processing queue means are being processed; and means for initiating processing of the messages queued in the first processing queue means.

29. A queue management method for servicing a plurality of messages, each message from the plurality of messages having a destination code from a plurality of destination codes, the system including a controlling queue for queuing messages and a processing queue, the queue management method comprising the steps of:

(a) transferring the messages to the controlling queue; and (b) transferring the messages from the controlling queue to the processing queue, wherein all messages queued in the processing queue at any time share a destination code, including the following substep:

(b.1) processing a first message having a first destination code by allocating an empty processing queue from the plurality of processing queues to queue the first message, wherein the empty processing queue most recently queued messages having a second destination code.

30. A method as in claim 29, wherein substep (b.1) includes retaining, when there is no processing queue queuing the messages of the first destination code and no processing queue from the plurality of processing queues is empty, the first message in the controlling queue until a processing queue is empty.

* * * * *